United States Patent [19]
Smith et al.

[11] Patent Number: 5,367,651
[45] Date of Patent: Nov. 22, 1994

[54] INTEGRATED REGISTER ALLOCATION, INSTRUCTION SCHEDULING, INSTRUCTION REDUCTION AND LOOP UNROLLING

[75] Inventors: Kevin J. Smith, Boulder Creek; Hugh R. Kenner, Cupertino; William A. Savage, Milpitas; Alice Kwong, Los Altos, all of Calif.

[73] Assignee: Intel Corporation, Santa Clara, Calif.

[21] Appl. No.: 982,962

[22] Filed: Nov. 30, 1992

[51] Int. Cl.$^5$ .............................................. G06F 12/00
[52] U.S. Cl. ................................. 395/700; 364/280.5; 364/281.6; 364/973
[58] Field of Search ................................ 395/375, 700

[56] References Cited
U.S. PATENT DOCUMENTS
4,782,444 11/1988 Munshi ................................ 395/700
5,261,062 11/1993 Sato ..................................... 395/700

OTHER PUBLICATIONS
D. G. Bradlee, S. J. Eggers, R. R. Henry, Integrating Register Allocation and Instruction scheduling for RISCS, ACM 1991 (ACM 0-89791-380-9/91/00-03-0122).

*Primary Examiner*—David Y. Eng
*Attorney, Agent, or Firm*—Blakely, Sokoloff, Taylor & Zafman

[57] ABSTRACT

An improved register allocator, an improved instruction scheduler, an instruction combiner, and an improved loop unroller is provided to the code generator of a compiler of a computer system. Both the improved instruction scheduler and the improved loop unroller support a "preliminary" and a "final" mode of operation. Upon invocation, the improved register allocator determines and prioritizes regions of the program being compiled. Next, the improved register allocator, in cooperation with the improved instruction scheduler, the instruction combiner, and the improved loop unroller, determines the optimal partitioning for global and local registers for each region. Then, the improved register allocator allocates registers to each region based on the determined number of global registers for the region. After allocating registers for each region, the improved register allocator merges the regions together. The improved loop unroller and the improved instruction scheduler are then invoked successively in "final" mode to unroll the various loops and schedule the instructions being generated.

18 Claims, 9 Drawing Sheets

| COMBINATION OF INSTRUCTIONS | EQUIVALENT SINGLE INSTRUCTIONS |
|---|---|
| 86a: load byte; shift left 24; shift right 24 | load byte sign extended |
| 86b: clear register; load byte | load byte zero extended |
| 86c: load half-word; shift left 16; shift right 16 | load half-word sign extended |
| 86d: clear register; load half-word | load half-word zero extended |
| 86e: load memory → register; compare immediate to register | compare immediate to memory |
| 86f: load memory → register 2; compare register 1 to register 2 | compare memory to register 1 |
| 86g: load memory → register 2; (add, mul, xor, and, or) register 2 to register 1 | (add, mul, xor, and, or) memory to register 1 |
| 86h: load memory → register 2; (add, mul, xor, and, or) register, to register 2; store register 2 → memory | (add, mul, xor, and, or) register 1 to memory |
| 86i: load memory → register; (add, mul, xor, and, or) immediate to register; store register → memory | (add, mul, xor, and, or) immediate to memory |

| | EXAMPLE 1 | EXAMPLE 2 |
|---|---|---|
| SOURCE | k ++; | k ++; m++; |
| AFTER REGISTER PRE-ALLOCATION | LOAD k → r1<br>ADD $1, r1 → r2<br>STORE r2 → k | LOAD k → r1<br>ADD $1, r2 → r2<br>STORE r2 → k<br>LOAD m → r3<br>ADD $1, r3 → r4<br>STORE r4 → m |
| AFTER PRE-SCHEDULING | LOAD k → r1 (np)<br>ADD $1, r1 → r2 (np)<br>STORE r2 → k (np) | LOAD k → r1 (p)<br>ADD $1, r1 → r2 (p)<br>STORE r2 → k (p)<br>LOAD m → r3 (p)<br>ADD $1, r3 → r4 (p)<br>STORE r4 → m (p) |
| AFTER INSTR. COMBINING | ADDM $1, k | LOAD k → r1 (p)<br>ADD $1, r1 → r2 (p)<br>STORE r2 → k (p)<br>LOAD m → r3 (p)<br>ADD $1, r3 → r4 (p)<br>STORE r4 → m (p) |
| GLOBAL/ LOCAL REG PARTITION | NO LOCAL REG NEEDED | TWO LOCAL REG NEEDED<br>(r1 & r2 share)<br>(r3 & r4 share) |
| AFTER FINAL ALLOCATION AND SCHEDULING | ADDM $1, k | LOAD k → reg1<br>LOAD m → reg2<br>ADD $1, reg1 → reg1<br>ADD $1, reg2 → reg2<br>STORE reg1 → k<br>STORE reg2 → m |

90a
90b
90c
90d
90e
90f

NOTE: np = Not scheduled for parallel execution
p = Scheduled for parallel execution

*Figure 8*

| ORIGINAL | UNROLL ONCE | UNROLL TWICE |
|---|---|---|
| (1) FLD A(I) → R1<br>(3) FADD R1, $2 → R1<br>(5) FST R1 → B(I)<br>ADD I, $1 → I<br>JUMP, LOOP | (1) FLD A(I) → R1<br>(2) FLD A(I+1) → R2<br>(3) FADD R1, $2 → R1<br>(4) FADD R2, $2 → R2<br>(5) FST R1 → B(I)<br>(6) FST R2 → B(I+1)<br>ADD I, $2 → I<br>JUMPLT LOOP | (1) FLD A(I) → R1<br>(2) FLD A(I+1) → R2<br>(3) FLD A(I+2) → R3<br>(4) FADD R1, $2 → R1<br>(5) FADD R2, $2 → R2<br>(6) FADD R3, $2 → R3<br>(7) FST R1, B(I)<br>(8) FST R2, B(I+1)<br>(9) FST R3, B(I+2)<br>ADD I, $3 → I<br>JUMPLT LOOP |

*Figure 10*

INTEGRATED REGISTER ALLOCATION, INSTRUCTION SCHEDULING, INSTRUCTION REDUCTION AND LOOP UNROLLING

BACKGROUND OF THE INVENTION

1. Field of the Invention

The present invention relates to the field of computer systems. More specifically, the present invention relates to register allocation, instruction scheduling and loop unrolling performed by compilers of these computer systems.

2. Background

Traditionally, register allocation and instruction scheduling are performed independently with one process before the other during code generation. There is little communication between the two processes. Register allocation focuses on minimizing the amount of loads and stores, while instruction scheduling focuses on maximizing parallel instruction execution. Typically, the process performed first is favored. If register allocation is performed first, it creates false dependencies for the instruction scheduler. On the other hand, if instruction scheduling is performed first, it might pessimize the code as a result of subsequently determining that more spilling is necessary. Intuitively, it would appear obvious that a coordinated approach to register allocation and instruction scheduling would increase the overall program execution efficiency.

In *Integrated Register Allocation and Instruction Scheduling for RISCs*, ACM pp. 122-131, (ACM 0-89791-380-9/91/00003-0122), David G. Bradlee, et al., described the results of their comparative study on three approaches to register allocation and instruction scheduling for RISC computers. The first approach is a simple postpass approach, in which global register allocation is performed prior to instruction scheduling. The second approach is a variation of integrated prepass scheduling, in which the scheduler is invoked before register allocation. The scheduler must schedule within a predetermined local register limit. The third approach is an integrated register allocation and instruction scheduling by giving the register allocator cost estimates that quantify the effect of its allocation choices on the subsequently generated schedule.

More specifically, under the integrated approach, a prescheduler is invoked to compute a schedule cost estimate for each value in a series of register limits for each basic block of the program being compiled. A schedule cost estimate is the estimated number of machine cycles required to execute the instructions in a basic block, while remaining within the particular register limit. Then during register allocation, the register allocator allocates registers to global pseudo registers based on the incremental costs to scheduling as well as spill costs. The incremental cost to scheduling is computed using the schedule cost estimates, which reflects the additional cycles required to execute a basic block if it is scheduled with a reduced register limit. Finally, the scheduler schedules each basic block allocating registers to local pseudo registers within the register limit for the basic block.

Bradlee, et al. described a 12% improvement in execution performance for their benchmark between the second and the first approach, and between the third and the first approach. In light of the insignificant difference in execution performance improvement between the second and the third approach, Bradlee, et al. concluded that some level of integration between register allocation and instruction scheduling is beneficial, however, highly integrated register allocation and instruction scheduling perhaps is unnecessary.

Thus it is desirable to have a loosely coupled register allocation and instruction scheduling approach that is relatively easy and inexpensive to implement, and yet it produces significant improvement to the execution performance of the generated code. As will be disclosed, the present invention provides a method and apparatus for integrated register allocation, instruction scheduling, instruction combining, and loop unrolling that achieves the above described desired results.

SUMMARY OF THE INVENTION

A method and apparatus for integrated register allocation, instruction scheduling, instruction combining, and loop unrolling is disclosed. The disclosed method and apparatus has particular application to code generators of compilers for target machines that support parallel instruction execution, but have limited number of registers. Under the disclosed method and apparatus, register allocation, instruction scheduling, instruction combining, and loop unrolling are advantageously coupled in an easy to implement manner, but yielding significant improvement to the execution performance of the generated code.

The advantageous results are achieved by providing an improved register allocator, an improved instruction scheduler, an instruction combiner, and an improved loop unroller to the code generator of a compiler of the target machine. Both the improved instruction scheduler and the improved loop unroller support a "preliminary" and a "final" mode of operation. Upon invocation, the improved register allocator determines and prioritizes regions of the program being compiled. Next, the improved register allocator, in cooperation with the improved instruction scheduler, the instruction combiner, and the improved loop unroller, determines the optimal partitioning for global and local registers for each region. Then, the improved register allocator allocates registers to each region based on the determined number of global registers for the region. After allocating registers for each region, the improved register allocator merges the regions together. The improved loop unroller and the improved instruction scheduler are then invoked successively in "final" mode to unroll the various loops and schedule the instructions being generated.

The improved register allocator determines the optimal global and local register partitions for a region by first making a preliminary register allocation for the region using all registers of the target machine. Upon making the preliminary allocation, the improved register allocator invokes the improved instruction scheduler in "preliminary" mode. In response, the improved instruction scheduler provides the improved register allocator with a preliminary scheduling of the instructions being generated. The improved instruction scheduler makes a preliminary instruction schedule using a copy of all registers in the target machine in addition to the globally allocated registers. The improved register allocator determines the optimal global/local register partition based on whether the improved register allocator or the improved instruction scheduler can better utilize a given register.

In the presently preferred embodiment, before determining the optimal global/local register partition, the improved register allocator invokes the instruction combiner to replace combinations of instructions with equivalent single combined instructions that are not being executed in parallel with other instructions by their equivalent single combined instructions. The improved register allocator invokes the improved instruction scheduler in "preliminary" mode again to update the preliminary instruction schedule if the instruction combiner altered the instructions to be generated. Additionally, the improved register allocator invokes the improved loop unroller in "preliminary" mode. In response, the improved loop unroller, with the help of the improved instruction scheduler, provides the improved register allocator with the optimal number of times the various loops should be unrolled.

The improved loop unroller when invoked in "preliminary" mode determines the optimal numbers the various loops should be unrolled by repeatedly invoking the improved instruction scheduler in "preliminary" mode for various times the loops are to be unrolled. Each time, in response, the improved instruction scheduler provides the improved loop unroller with a preliminary instruction schedule that indicates the amount of parallelism that can be achieved.

BRIEF DESCRIPTION OF THE DRAWINGS

The objects, features, and advantages of the present invention will be apparent from the following detailed description of the presently preferred and alternate embodiments of the invention with references to the drawings in which:

FIG. 7 illustrates exemplary combinations of instructions that can be reduced into exemplary single instructions.

FIG. 8 illustrates an exemplary instruction combining under the present invention.

FIG. 10 illustrates an exemplary loop unrolling under the present invention.

DETAILED DESCRIPTION PRESENTLY PREFERRED AND ALTERNATE EMBODIMENTS

A method and apparatus for integrated register allocation, instruction scheduling, instruction combining, and loop unrolling is disclosed. The disclosed method and apparatus has particular application to code generators of compilers for target machines that support parallel instruction execution, but have limited number of registers. Under the disclosed method and apparatus, register allocation, instruction scheduling, instruction combining, and loop unrolling are advantageously coupled in an easy to implement manner, but yielding significant improvement to the execution performance of the generated code. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
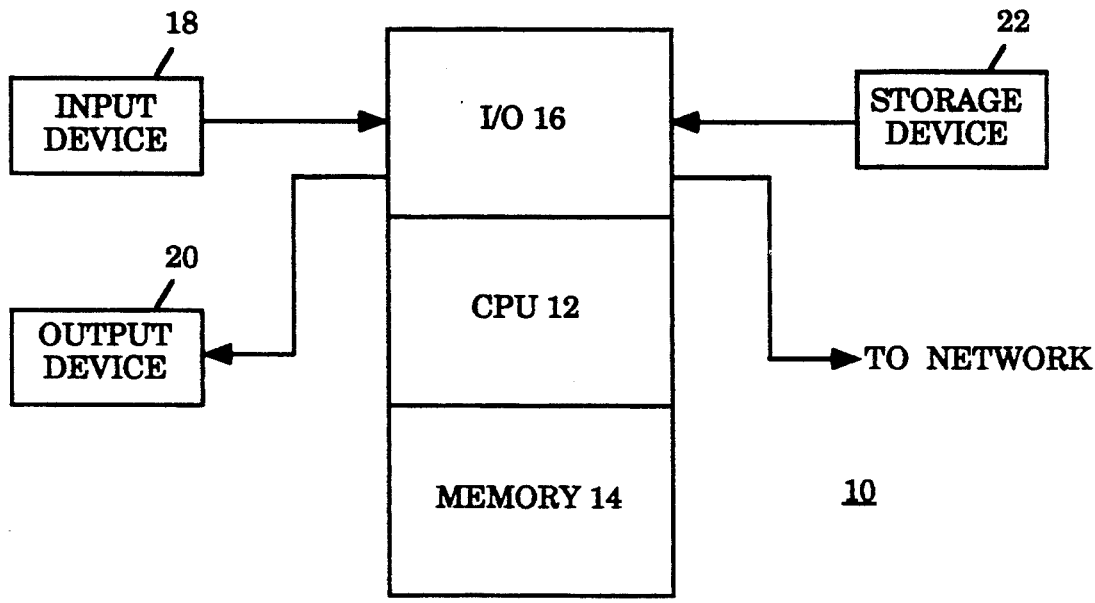
FIG. 1 illustrates an exemplary computer system incorporated with the teachings of the present invention.

Referring now to FIG. 1, a block diagram illustrating an exemplary computer system incorporated with the teachings of the present invention is shown. The exemplary computer system 10 comprises a central processing unit (CPU) 12, a memory 14, and an I/O module 16. Additionally, the exemplary computer system 10 also comprises a number of input/output devices 18 and 20, and a number of storage devices 22. The CPU 12 is coupled to the memory 14 and the I/O module 16. The input/output devices, 18 and 20, and the storage devices 22 are also coupled to the I/O module 16. The I/O module 16 in turn is coupled to a network.

CPU 12 comprises a plurality of pipelines for parallel and overlapping execution of instructions. Additionally, various combinations of instructions supported by CPU 12 have equivalent single combined instructions. FIG. 7 illustrates various exemplary combinations of instructions and their corresponding exemplary equivalent single combined instructions. For examples, the exemplary instruction sequence "load byte, shift left 24, shift right 24", is equivalent to the exemplary single combined instruction "load byte sign extended", 86a; the exemplary instruction sequence "load memory→register, compare immediate, register", 86e, is equivalent to the exemplary single combined instruction "compare immediate, memory", 86e; and the exemplary instruction sequence "load memory→register, add immediate to, register, store register→memory" is equivalent to "add immediate to, memory", 86i. However, when an equivalent single combined instruction is used, CPU 12 cannot execute as many other instructions in parallel.

Except for the manner they are used to practice the present invention, the CPU 12, the memory 14, the I/O module 16, the input/output devices, 18 and 20, the storage devices 22, and the network, are intended to represent a broad category of these hardware elements found in most computer systems. The constitutions and basic functions of these elements are well known and will not be otherwise further described here.

Figure 2:
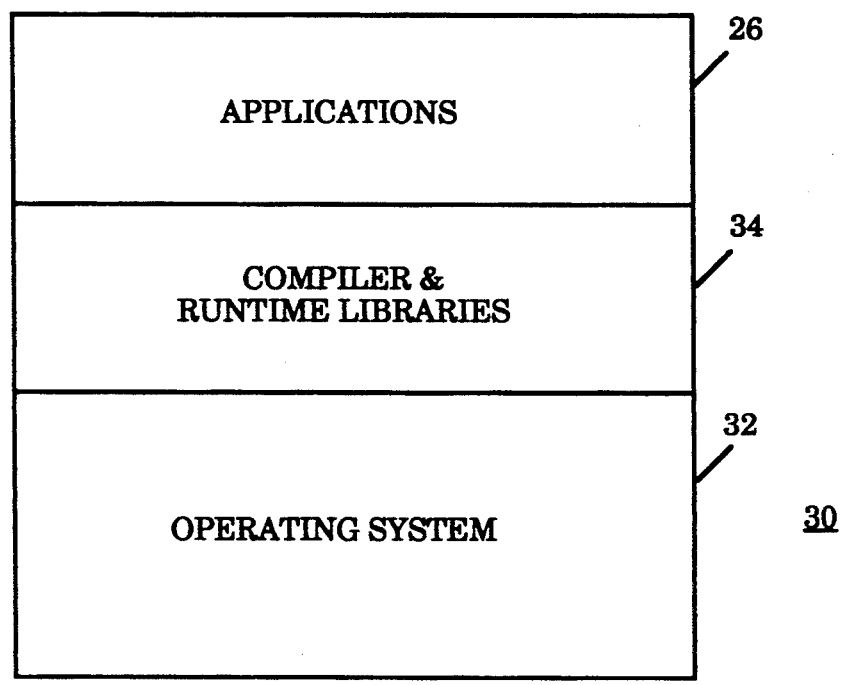
FIG. 2 illustrates the software elements of the exemplary computer system of FIG. 1.

FIG. 2 illustrates the software elements of the exemplary computer system of FIG. 1. Shown are application programs 26 compiled using the compiler 34. The compiled application programs 26 access the runtime libraries 34 for services during execution, which in turn access the operating system 32 for system services. The compiler 34 also accesses the operating system 32 for system services during compilation of application programs 26. Similar to the hardware elements, except for teachings of the present invention incorporated in the compiler 34, these software elements are intended to represent a broad category of similar software elements found in most computer systems. The constitutions and basic functions of these elements are well known and will not be otherwise further described here.

Figure 3:
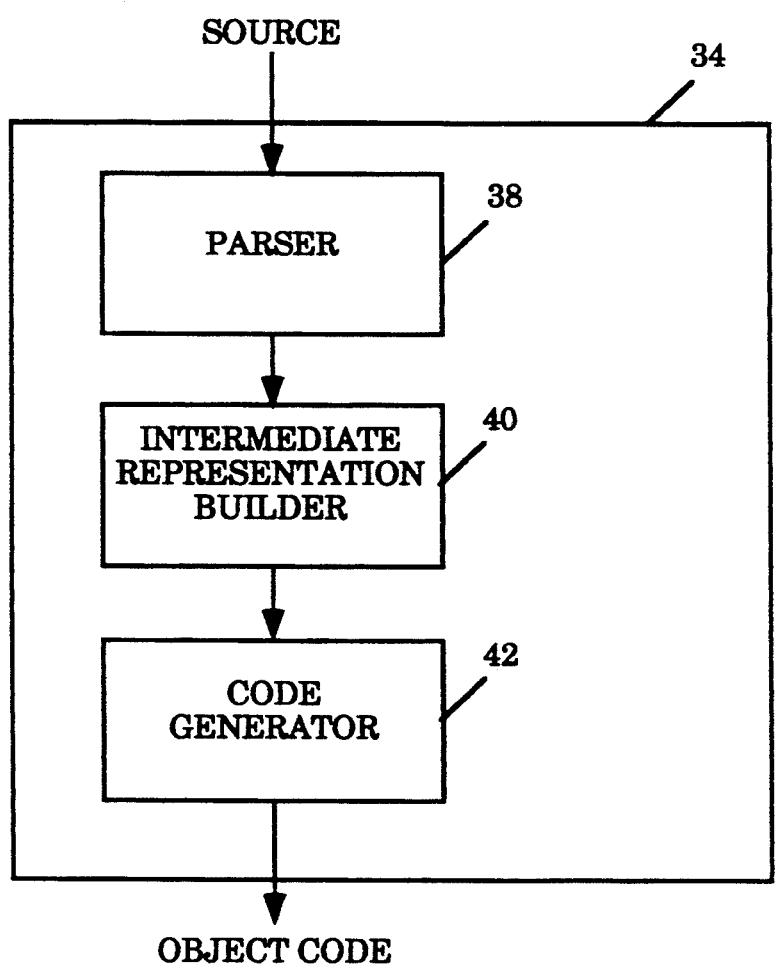
FIG. 3 illustrates one embodiment of the exemplary compiler of FIG. 2.

Referring now to FIG. 3, a block diagram illustrating one embodiment of the compiler of FIG. 2 is shown. In this embodiment, the compiler 34 comprises a parser 38, an intermediate representation builder 40, and a code generator 42. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. Except for teachings of the present invention incorporated in the code generator 42, these components are intended to represent a broad category of similar components found in most compilers. The constitutions and basic functions of these components are well known and will not be otherwise further described here.

Figure 4:
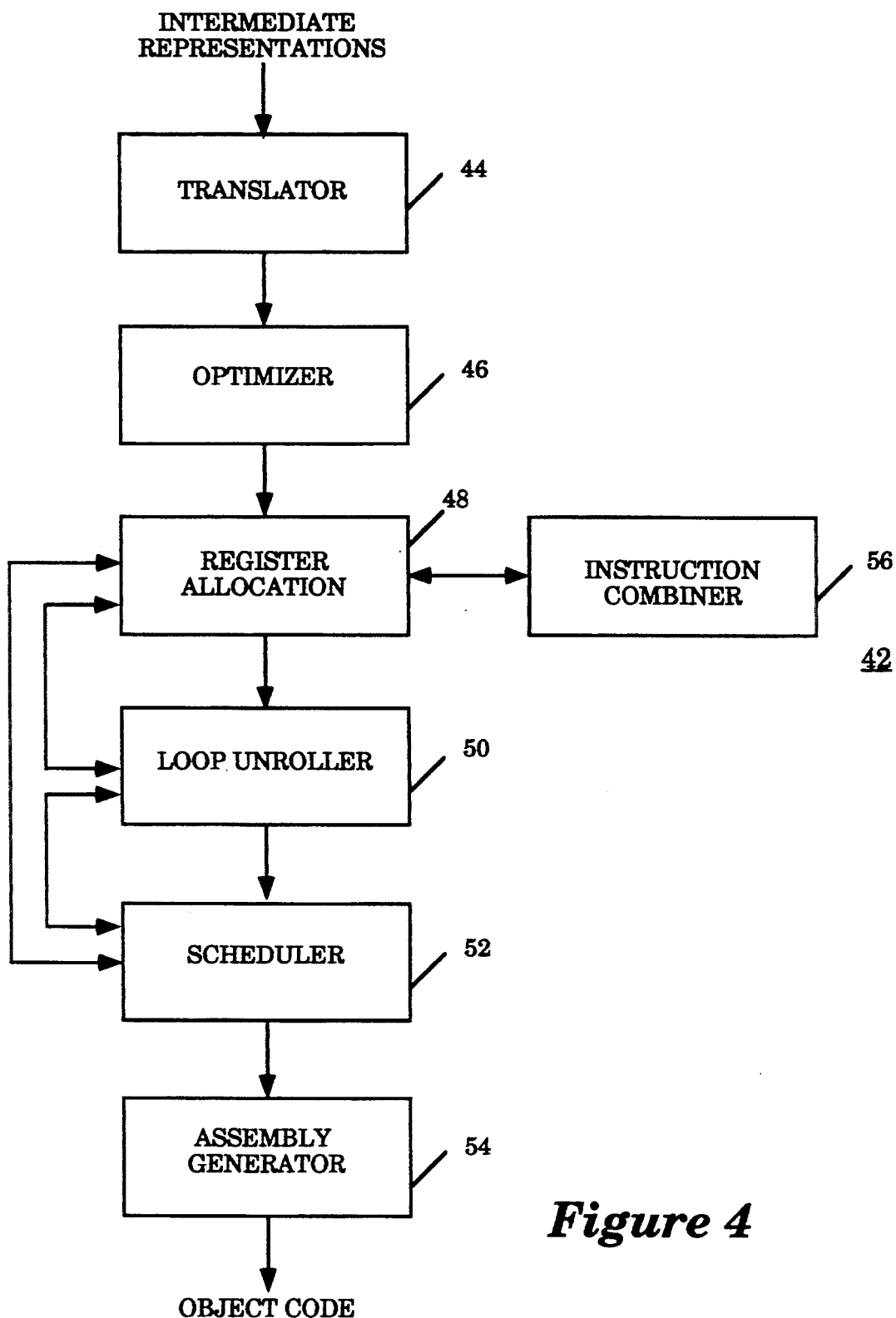
FIG. 4 illustrates the components of the code generator of the present invention.

Referring now FIG. 4, a block diagram illustrating the presently preferred embodiment of the code generator of FIG. 3 is shown. In the presently preferred embodiment, the code generator 42 comprises a translator 44, an optimizer 46, an improved register allocator 48, an improved loop unroller 50, an improved scheduler 52, an assembly code generator 54, and an instruction combiner 56. The translator 44 receives the intermediate representations as inputs. In response, the translator 44 builds loop table, orders instruction blocks, constructs data flow graphs etc. The improved optimizer 46 receives the intermediate representations and associated information as inputs. In response, it performs various optimizations.

The improved register allocator 48 receives the optimized intermediate representations and associated information as inputs. In response, the improved register allocator 48, in cooperation with the improved instruction scheduler, the improved loop unroller and the instruction combiner of the present invention, determines the optimal partitioning for global and local registers for each region of the program, allocates the global registers of each region and then merges the regions together.

The instruction combiner 56, when invoked by the improved register allocator 48, identifies the combinations of instructions having equivalent single combined instructions that are not being scheduled for parallel execution with other instructions, and replaces these identified combinations with their corresponding equivalent single combined instructions. Combinations of instructions having equivalent single combined instruction and scheduled for parallel execution with other instructions, will not be replaced with their corresponding equivalent single combined instructions, since replacing them will adversely impact the CPU's ability to execute instructions in parallel. Whenever instructions are combined, local register pressure is advantageously reduced.

While the present invention is being described with the presently preferred embodiment having an instruction combiner 56. It will be appreciated that the present invention may be practiced without the instruction combiner 56. Furthermore, while for ease of understanding the instruction combiner 56 is described with an embodiment that combines instructions only if they are not scheduled for execution in parallel, it will be appreciated that the present invention may be practiced with a more intelligent instruction combiner having better understanding of the negative impact on parallel execution, thereby being able to combine instructions even for some situations where the instructions are scheduled for parallel execution.

The improved loop unroller 50 has two modes of operations, a "preliminary" mode and a "final" mode. When invoked in "preliminary" mode by the improved register allocator 48, the improved loop unroller 50, in cooperation with the improved scheduler 52, determines and provides the improved register allocator with the optimal number of times the various loops in the program being compiled should be unrolled. The improved loop unroller 50 determines the optimal number of times the various loops should be unrolled by repeatedly invoking the improved scheduler 52 to determine the amount of parallelism that can be achieved for different number of times the various loops are unrolled. Unrolling too few times does not achieve the maximum speed up potential. On the other hand, unrolling too many times can pessimize the program because of possible increase in spilling and code size. When invoked in "final" mode by the improved register allocator 48, the loop unroller 50 receives the optimized intermediate representations with allocated global registers and associated information as inputs. In response, it restructures the instructions being generated, unrolling loops in the instructions being generated for the determined optimal number of times consistent with the resources available in the exemplary computer system of FIG. 1.

The improved scheduler 52 also has two modes of operation, a "preliminary" mode and a "final" mode. When invoked in "preliminary mode" by either the improved register allocator 48 or the improved loop unroller 50, the improved scheduler 52 determines and provides a preliminary instruction schedule for its invoker, thereby providing the invoker with an estimate on the amount of parallelism that can be achieved. The improved scheduler 52 determines the preliminary instruction schedule, allocating local registers, using all registers of the target machine. When invoked in "final mode", the improved scheduler 52 receives the unrolled intermediate representations and associated information as inputs. In response, it determines the final instruction schedule, allocating the local registers. In both cases, all global register candidates have been either assigned or spilled. The improved scheduler 52 is concerned with only the local register candidates.

Lastly, the assembly code generator 54 receives the optimized, register allocated, and restructured intermediate representations and associated information as inputs. In response, it generates the object code for the program being compiled.

The translator 44, the optimizer 46, and the assembly code generator 54, are intended to represent a broad category of similar modules found in most code generators. The constitutions and basic functions of these modules are well known and will not be otherwise further described here. Except for the teachings of the present invention incorporated, in particular, the manner they cooperate with the improved register allocator 48, the improved loop unroller 50 and the improved scheduler 52, are intended to represent a broad category of similar modules found in most code generators. The constitutions and basic functions of these modules are well known and will not be otherwise further described here. Similarly, except for the manner it cooperates with the improved register allocator 48, the various manners in which the instruction combiner may be implemented are well within the skill of those skilled in the art, and therefore will not be otherwise further described either. The improved register allocator 48 and the manner it cooperates with the improved loop roller 50, the improved scheduler 52, and the instruction combiner 54 will be described below with references to the remaining figures.

Figure 5:
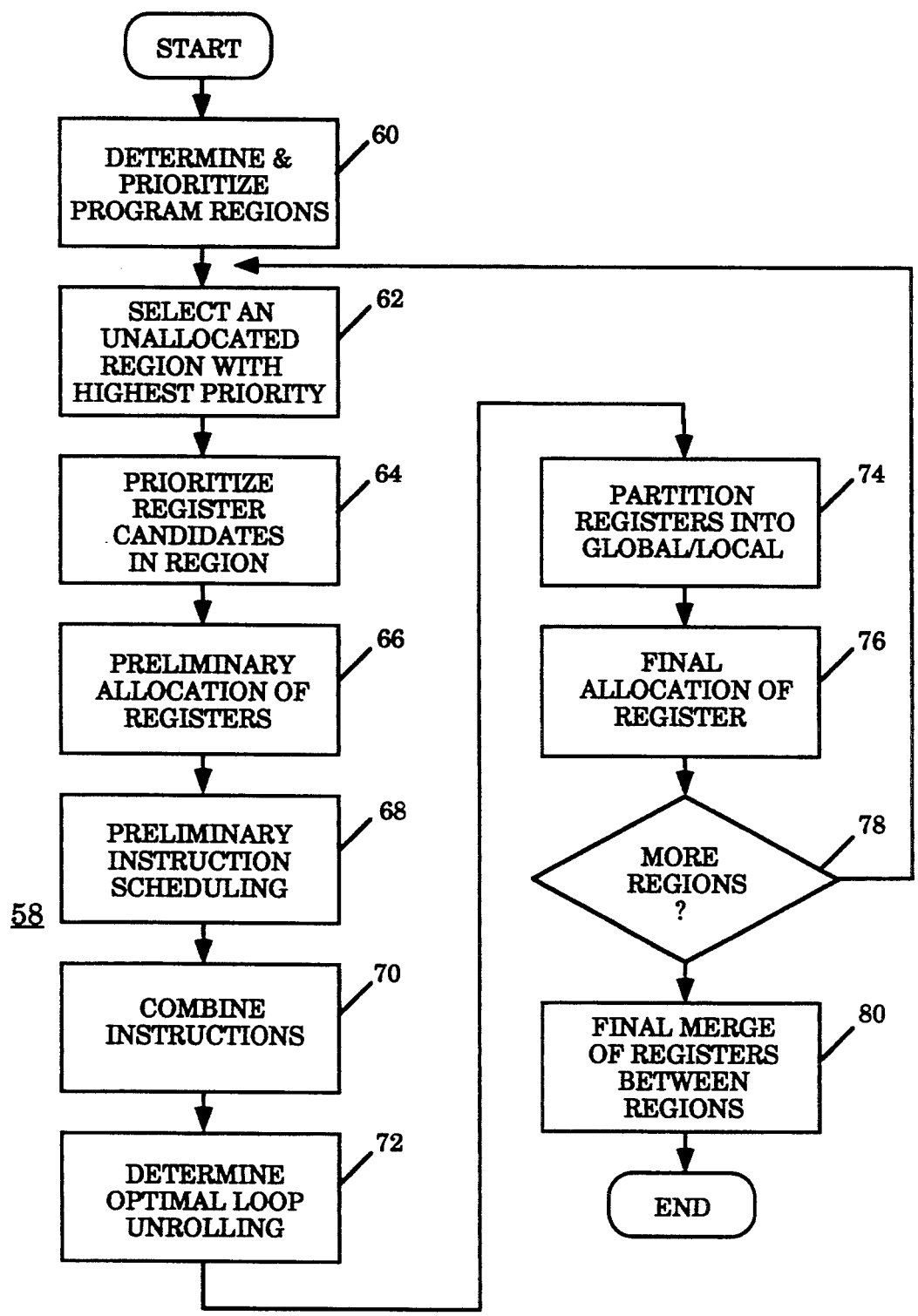
FIG. 5 illustrates the operation flow of the improved register allocator, and its interaction with the improved instruction scheduler, the instruction combiner and the improved loop unroller of the present invention.

Referring now to FIG. 5, a block diagram illustrating the operation flow of the improved register allocator of FIG. 4 and the manner it cooperates with the improved scheduler, the improved loop unroller and the instruction combiner are shown. As illustrated in FIG. 5, upon receiving the intermediate representations and their associated information from the translator as inputs, the improved register allocator determines and prioritizes the regions of a program, block 60. The program is divided into regions to localize the optimizations. A good allocation in one part of the program may not be a good allocation in another part of the program.

Figure 6:
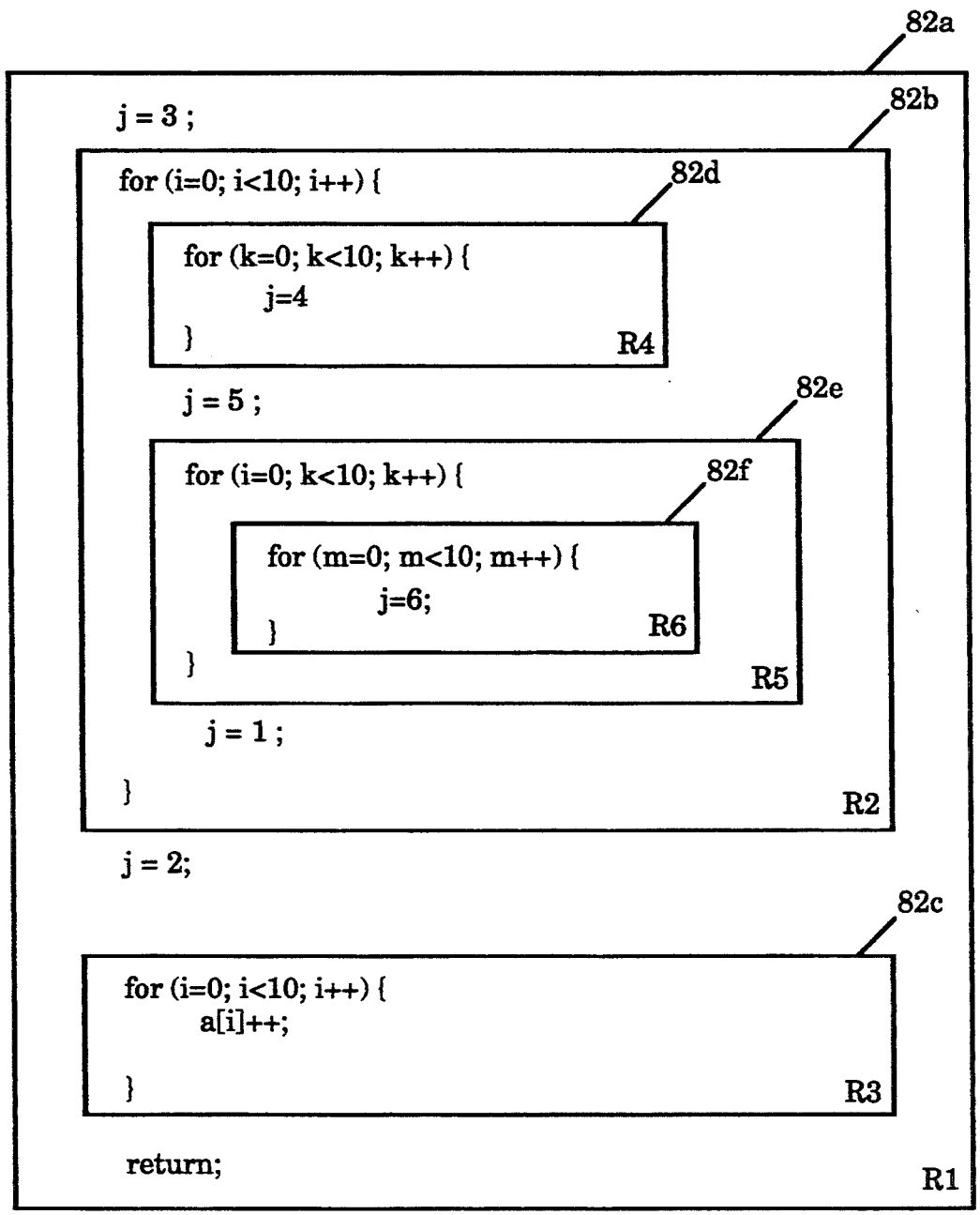
FIG. 6 illustrates program regions and region priorities under the present invention.

FIG. 6 illustrates program regions and region priorities using an exemplary program. A region comprises a collection of basic blocks which satisfy the following predecessor and successor relationship rules with basic blocks outside the region: (1) all basic blocks outside a region having a successor basic block in the region have one and only one successor basic block; (2) all basic blocks outside a region having a predecessor basic block in the region have one and only one predecessor basic block. Basic blocks of an enclosed region are also considered as basic blocks of the enclosing region. When forming regions, empty blocks may be inserted between blocks to satisfy the above single predecessor and single successor basic block rules. Typically, loops map to regions. The innermost region is given the highest priority, and the outermost region is given the lowest priority. In this exemplary program, there are six regions R1 through R6, 82a–82f. R6 82f being the inner most region has the highest priority. R4 and R5, 82d and 82e, being the next inner regions have the next highest priority, and so forth.

Referring back to FIG. 5, upon determining and prioritizing the regions, the improved register allocator selects an unallocated region with the highest priority, block 62, and prioritizes the register candidates in the selected region, block 64. In the presently preferred embodiment, priorities of register candidates are determined based on use and definition counts of the register candidates in the region. It will be appreciated that other prioritization schemes may be used instead.

Referring back to FIG. 5 again, upon determining the priority of the register candidates within the selected region, the improved register allocator makes a preliminary allocation of global registers using all registers of the target machine, block 66. Next, the improved register allocator invokes the improved scheduler in "preliminary" mode, block 68. As described earlier, in response, the improved scheduler provides the improved register allocator with a preliminary schedule. The improved scheduler, in "preliminary" mode, schedules instructions, also using a copy of all registers of the target machine, in addition to those previously allocated by the global register allocator. The improved scheduler makes the actual local register allocation when it is invoked in "final" mode after the register allocator made the final global register allocation and the loop unroller actually unrolled the loops.

Next, the improved register allocator invokes the instruction combiner, block 70. As described earlier, the instruction combiner identifies combinations of instructions having equivalent single instructions and are not being scheduled for parallel execution with other instructions, and replaces these identified combinations with their corresponding equivalent single instructions. The improved register allocator invokes the improved instruction scheduler in "preliminary" mode again to update the preliminary instruction schedule if the instruction combiner altered the instructions to be generated.

Next, if the region corresponds to an inner loop, the improved register allocator invokes the improved loop unroller in "preliminary" mode, block 72. As described earlier, the improved loop unroller, in "preliminary" mode, in cooperation with the improved scheduler, determines the optimal number of the times the loop in the region should be unrolled. The improved loop unroller repeatedly invokes the improved scheduler in "preliminary" mode to schedule instructions for different number of times the loops are unrolled. The loop unroller actually unrolls the loops when it is invoked in "final" mode after the register allocator made the final global register allocation.

Then the improved register allocator determines the optimal partition for global and local registers, block 74. The improved register allocator determines the optimal partition by determining whether the improved register allocator or the improved scheduler can better utilize a particular register. For simplicity, in the presently preferred embodiment, the improved register allocator determines the utility based on usage and definition counts. It will be appreciated that the improved register allocator may be implemented with a variety of other utility determination functions.

Upon determining the optimal partition for global and local registers for the region, the improved register allocator makes a final allocation of the global registers, block 76.

The process, blocks 62–76, is repeated for each region in order of their priorities, until the optimal partition for global and local registers is determined for each region, and the global registers of each region are allocated. The global register allocation for the various regions are then merged together, block 80, introducing spill code if necessary. Merging is a process whereby situations like a register candidate is assigned to different registers in different regions or assigned to a register in one region and spilled in another are reconciled.

Referring now to FIG. 8, a block diagram illustrating an exemplary instruction combining under the present invention is shown. Shown is an example where instructions are combined and an example where instructions are not combined notwithstanding the existence of equivalent single combined instructions. Example one comprises a single source instruction "k++", while example two comprises two source instructions "k++" and "m++", where k and m refer to different memory locations, 90a. The instructions after register pre-allocation and after pre-scheduling are illustrated in the second and third row, 90b and 90c. The instructions in example one are marked "np", not parallel, i.e. not scheduled for parallel execution, whereas the instructions in example two are marked "p", parallel, i.e. scheduled for parallel execution.

Thus, after the instruction combiner is called, 90d, the instructions in example one is replaced with the equivalent single combined instruction "addm $1, k", whereas the instructions in example two are not replaced with their corresponding equivalent single combined instructions. During the global/local register partitioning phase, example one is determined to have no local register needs, whereas, example two is determined to have a need for two local registers, r1 and r2 sharing one, r3 and r4 sharing the other, 90e. The final instructions after final register allocation and scheduling are illustrated in the last row, 90f.

Figure 9:
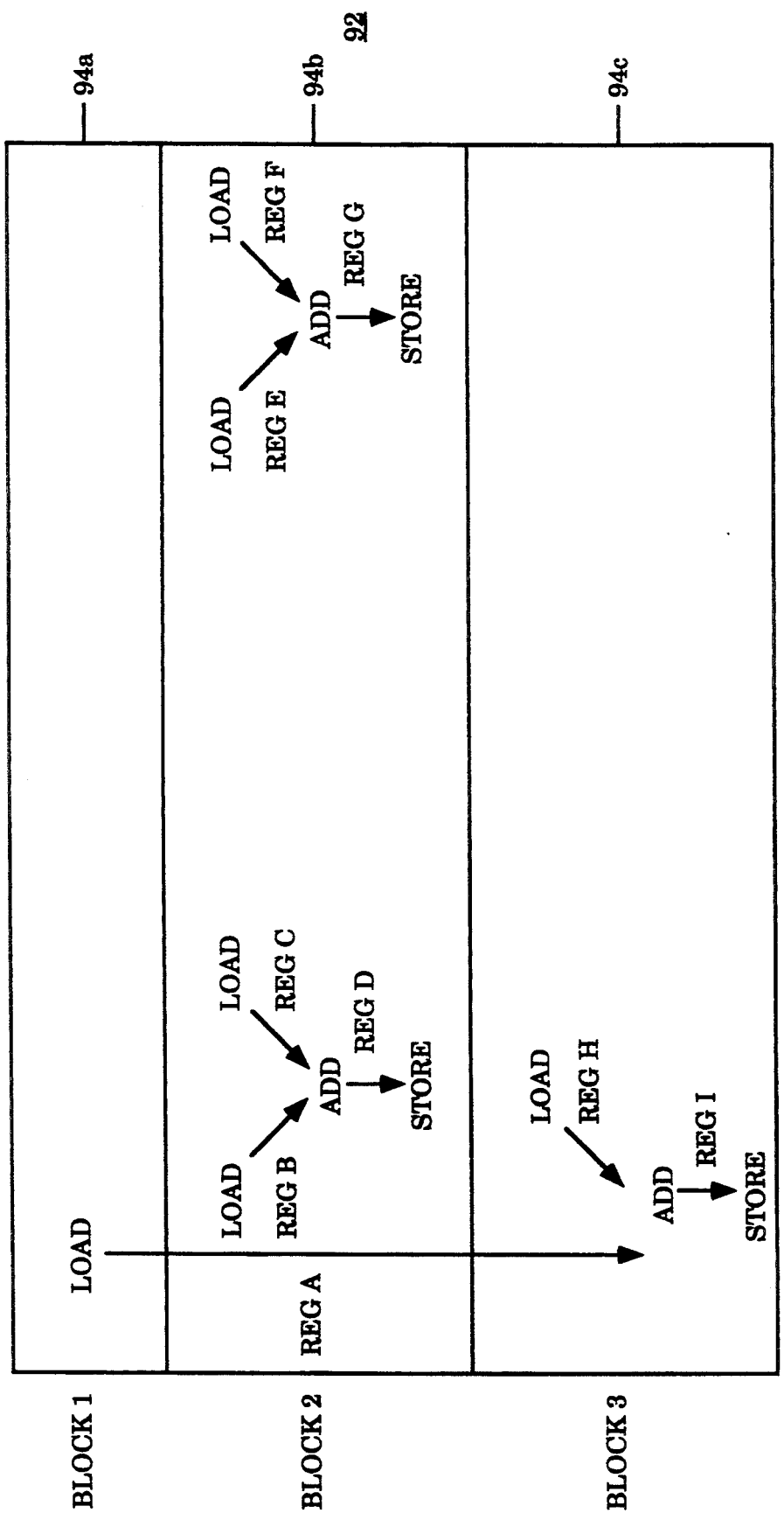
FIG. 9 illustrates an exemplary global and local register partitioning under the present invention.

Referring now to FIG. 9, a block diagram illustrating an exemplary global and local register partitioning is shown. Shown is a program 92 comprising three basic blocks, 94a-94c. Block 1 94a comprises a load instruction having a register candidate REG A that is live through block 2 94b and block 3 94c. Block 2 94b comprises two groups of Load, Load, Add and Store instructions involving register candidates REG B through REG G that are live only within block 2 94b. Lastly, block 3 94c comprises a group of Load, Add and Store instructions involving register candidates REG A, REG H and REG I. REG H and REG I are both live within block 3 94c only.

In block 2, 94b, since REG A is the only register candidate that is live through the block, the register allocator has at most a need of one register for global register allocation. On the other hand, to maximize parallelism, REG B, REG C, REG E, and REG F should be allocated different registers. However, without spilling, while REG B and REG C need separate registers as well as REG E and REG F, REG B and REG E could share the same registers as well as REG C and REG F. Thus the scheduler could use as many as four registers, but can allocate with only two registers.

If there are five registers available, the register allocator would get one for global register allocation, whereas the scheduler would get four for local register allocation. However, if there are only three registers available, the register allocator could wind up having no registers for global register allocation, whereas the scheduler would get all three registers for local register allocation, depending on the tradeoff utility functions used.

Referring now to FIG. 10, a block diagram illustrating an exemplary loop unrolling under the present invention is shown. Shown is an exemplary loop 98a in its original form. As described earlier, the loop unroller repeatedly invokes the scheduler in the "preliminary" mode to determine the optimum number of times to unroll the loop. Assuming each FLD and FADD instruction has a latency of two clock cycles, in the first invocation 98a, the scheduler "pre-schedules" the instructions for issuances at clock cycles (1), (3) and (5), leaving clock cycles (2) and (4) wasted. In the second invocation 98b, after the loop unroller unrolled the loop once, the scheduler "pre-schedules" the various instructions in the once unrolled loop at clock cycles (1) through (6), using up all consecutive clock cycles. The number of clock cycles required per iteration is reduced. Thus, unrolling the loop once improves the execution performance of the generated code.

In the third invocation 98c, after the loop unroller unrolled the loop twice, the scheduler "pre-schedules" the various instructions in the twice unrolled loop for issuances at clock cycles (1) through (9), also using up all consecutive clock cycles. However, since the number clock cycles required per iteration is unchanged, unrolling the loop twice does not improve the execution performance of the generated code. Moreover, if there are only two registers available for allocation, spill code will have to be introduced. In that case, unrolling the loop twice will actually degrade the execution performance of the generated code. Thus, the loop unroller, with the aid of the scheduler, determines that unrolling the loop once is the optimum number of unrolling for this exemplary loop.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a plurality of registers and a plurality of pipelines for parallel and overlapping execution of instructions, a method for allocating said registers to instructions being generated for a program being compiled, unrolling loops of said program, and scheduling said instructions being generated for execution, said method comprising the steps of:
   a) allocating global registers to said instructions being generated for a first time using all registers of said computer system;
   b) scheduling said instructions being generated for a first time, allocating local registers using a copy of all registers of said computer system;
   c) determining optimal number of times to unroll loops of said program;
   d) determining optimal partitioning of said registers of said computer system into global and local registers, said partitioning determination being made based on the relative utilities of each of said registers to global register allocation and instruction scheduling;
   e) allocating global registers to said instructions being generated for a second time using said registers of said computer system partitioned to be global registers;
   f) unrolling said loops; and
   g) scheduling said instructions being generated for a second time, allocating local registers using said registers of said computer system partitioned to be local registers.

2. The method as set forth in claim 1, wherein,
a plurality of combinations of said instructions have equivalent combined single instructions;
said step c) further comprises identifying said combinations of instructions that are not scheduled for parallel execution with other instructions, and replacing said identified combinations of instructions with their corresponding equivalent single instructions, said identification and replacement being performed before said determination of optimal number of times to unroll loops of said program.

3. The method as set forth in claim 1, wherein, said steps a) through e) are performed for regions of said program, one region at a time, in order of their priorities, each of said regions comprising a collection of basic blocks which satisfy the following predecessor and successor relationship rules with basic blocks outside the region:
   (1) all basic blocks outside the region having a successor basic block in the region have one and only one successor basic block, (2) all basic blocks outside the region having a predecessor basic block in the region have one and only predecessor basic block, said regions being merged after having said steps a) through e) performed on them.

4. The method as set forth in claim 1, wherein, said relative utilities in said step d) are measured by register usage and definition counts.

5. In a computer system comprising a plurality of registers and a plurality of pipelines for parallel and overlapping execution of instructions, an apparatus for allocating said registers to instructions being generated for a program being compiled, unrolling loops of said program, and scheduling said instructions being generated for execution, said apparatus comprising:
   a) first register allocation means for allocating global registers to said instructions being generated for a first time using all registers of said computer system;
   b) first scheduling means coupled to said first register allocation means for scheduling said instructions being generated for a first time, allocating local registers using a copy of all registers of said computer system;
   c) first loop unrolling means coupled to said first register allocation for determining optimal number of times to unroll loops of said program;
   d) partition determination means coupled to said first register allocation for determining optimal partitioning of said registers of said computer system into global and local registers, said partitioning determination being made based on the relative utility of each of said registers to global register allocation and instruction scheduling;
   e) second register allocation means coupled to said first register allocation means for allocating global registers to said instructions being generated for a second time using said registers of said computer system partitioned to be global registers;
   f) second loop unrolling means coupled to said second register allocation means for unrolling said loops; and
   g) second scheduling means coupled to said second unrolling means for scheduling said instructions being generated for a second time, allocating local registers using said registers of said computer system partitioned to be local registers.

6. The apparatus as set forth in claim 5, wherein,
a plurality of combinations of said instructions have equivalent combined single instructions;
said apparatus further comprises instruction combining means coupled to said first register allocation means for identifying said combinations of instructions that are not scheduled for parallel execution with other instructions, and replacing said identified combinations of instructions with their corresponding equivalent single instructions, said identification and replacement being performed before said determination of optimal number of times to unroll loops of said program.

7. The apparatus as set forth in claim 5, wherein, said first register allocation means, said first scheduling means, said first loop unrolling means, said partition determination means perform said first register allocation, said first instruction scheduling, said determination of optimal number of times to unroll loops of said program, and said partitioning of registers for regions of said program, one region at a time, in order of their priorities, each of said regions comprising a collection of basic blocks which satisfy the following predecessor and successor relationship rules with basic blocks outside the region:
   (1) all basic blocks outside the region having a successor basic block in the region have one and only one successor basic block,
   (2) all basic blocks outside the region having a predecessor basic block in the region have one and only predecessor basic block, said regions being merged after having said first time register allocation, said first time instruction scheduling, and said first time loop unrolling performed on them.

8. The apparatus as set forth in claim 5, wherein, said partition determination means measures said relative utilities by register usage and definition counts.

9. The apparatus as set forth in claim 5, wherein,
said first and second register allocation means being the same register allocation means;
said first and second scheduling means being the same scheduling means, said first scheduling means being said same scheduling means operating in a first mode, and said second scheduling means being said same scheduling means operating in a second mode;
said first and second loop unrolling means being the same loop unrolling means, said first loop unrolling means being said same loop unrolling means operating in a first mode, and said second loop unrolling means being said same loop unrolling means operating in a second mode.

10. In a computer system comprising a plurality of registers and a plurality of pipelines for parallel and overlapping execution of instructions, a code generator of a compiler for generating instructions for a program being compiled, wherein said registers are allocated to said instructions being generated, said code generator comprising:
   a) a translator for translating intermediate representations of said program;
   b) an optimizer coupled to said translator for receiving said intermediate representations and optimizing said instructions being generated for said program being compiled;
   c) first register allocator for allocating global registers to said instructions being generated for a first time using all registers of said computer system;
   d) first scheduler coupled to said first register allocator for scheduling said instructions being generated for a first time, allocating local registers using a copy of all registers of said computer system;
   e) first loop unroller coupled to said first register allocator for determining optimal number of times to unroll loops of said program;
   f) partition determinator coupled to said first register allocator for determining optimal partitioning of said registers of said computer system into global and local registers, said partitioning determination being made based on the relative utility of each of said registers to global register allocation and instruction scheduling;
   g) second register allocator coupled to said first register allocator for allocating global registers to said instructions being generated for a second time using said registers of said computer system partitioned to be global registers;
   h) second loop unroller coupled to said second register allocator for unrolling said loops;

i) second scheduler coupled to said second unroller for scheduling said instructions being generated for a second time, allocating local registers using said registers of said computer system partitioned to be local registers; and j) an assembly generator coupled to said scheduler for receiving said optimized, register allocated, and scheduled intermediate representations and generating said instructions for said program being compiled.

11. The code generator as set forth in claim 10, wherein, a plurality of combinations of said instructions have equivalent combined single instructions;

said code generator further comprises instruction combiner coupled to said first register allocator for identifying said combinations of instructions that are not scheduled for parallel execution with other instructions, and replacing said identified combinations of instructions with their corresponding equivalent single instructions, said identification and replacement being performed before said determination of optimal number of times to unroll loops of said program.

12. The code generator as set forth in claim 10, wherein, said first and second register allocator being the same register allocator;

said first and second scheduler being the same scheduler, said first scheduler being said same scheduler operating in a first mode, and said second scheduler being said same scheduler operating in a second mode;

said first and second loop unroller being the same loop unroller, said first loop unroller being said same loop unroller operating in a first mode, and said second loop unroller being said same loop unroller operating in a second mode.

13. In a computer system comprising a plurality of registers and a plurality of pipelines for parallel and overlapping execution of instructions, a compiler for compiling a program, wherein instructions being generated for said program being compiled having said registers allocated to them, said compiler comprising:

a) a parser for receiving source code of said program, parsing said source code and generating tokenized statements for said program;

b) an intermediate representation builder coupled to said parser for receiving said tokenized statements and building intermediate representations for said program; and c) a code generator coupled to said intermediate representation builder for generating instructions for said program, said code generator comprising an improved register allocator for allocating said registers to said instructions being generated, said improved register allocator comprising, c.1) a first register allocator for allocating global registers to said instructions being generated for a first time using all registers of said computer system;

c.2) a first scheduler coupled to said first register allocator for scheduling said instructions being generated for a first time, allocating local registers using a copy of all registers of said computer system;

c.3) a first loop unroller coupled to said first register allocator for determining optimal number of times to unroll loops of said program;

c.4) a partition determinator coupled to said first register allocator for determining optimal partitioning of said registers of said computer system into global and local registers, said partitioning determination being made based on the relative utility of each of said registers to global register allocation and instruction scheduling;

c.5) a second register allocator coupled to said first register allocator for allocating global registers to said instructions being generated for a second time using said registers of said computer system partitioned to be global registers;

c.6) a second loop unroller coupled to said second register allocator for unrolling said loops; and c.7) a second scheduler coupled to said second unroller for scheduling said instructions being generated for a second time, allocating local registers using said registers of said computer system partitioned to be local registers.

14. The compiler as set forth in claim 13, wherein, a plurality of combinations of said instructions have equivalent combined single instructions;

said improved code generator further comprises an instruction combiner coupled to said first register allocator for identifying said combinations of instructions that are not scheduled for parallel execution with other instructions, and replacing said identified combinations of instructions with their corresponding equivalent single instructions, said identification and replacement being performed before said determination of optimal number of times to unroll loops of said program.

15. The compiler as set forth in claim 13, wherein, said first and second register allocator being the same register allocator;

said first and second scheduler being the same scheduler, said first scheduler being said same scheduler operating in a first mode, and said second scheduler being said same scheduler operating in a second mode;

said first and second loop unroller being the same loop unroller, said first loop unroller being said same loop unroller operating in a first mode, and said second loop unroller being said same loop unroller operating in a second mode, 16. A computer system comprising:

a) a plurality of registers;

b) a plurality of pipelines for parallel and overlapping execution of instructions;

c) a compiler for compiling a program, wherein instructions being generated for said program being compiled having said registers allocated to them, said compiler comprising an improved code generator for generating said instructions for said program, said improvement comprising, c.1) a first register allocator for allocating global registers to said instructions being generated for a first time using all registers of said computer system;

c.2) a first scheduler coupled to said first register allocator for scheduling said instructions being generated for a first time, allocating local registers using a copy of all registers of said computer system;

c.3) a first loop unroller coupled to said first register allocator for determining optimal number of times to unroll loops of said program;

c.4) a partition determinator coupled to said first register allocator for determining optimal partitioning of said registers of said computer system into global and local registers, said partitioning determination being made based on the relative utility of each of said registers to global register allocation and instruction scheduling;

c.5) a second register allocator coupled to said first register allocator for allocating global registers to said instructions being generated for a second time using said registers of said computer system partitioned to be global registers;

c.6) a second loop unroller coupled to said second register allocator for unrolling said loops; and c.7) a second scheduler coupled to said second unroller for scheduling said instructions being generated for a second time, allocating local registers using said registers of said computer system partitioned to be local registers.

17. The computer system as set forth in claim 16, wherein, a plurality of combinations of said instructions have equivalent combined single instructions;

said improved code generator further comprises an instruction combiner coupled to said first register allocator for identifying said combinations of instructions that are not scheduled for parallel execution with other instructions, and replacing said identified combinations of instructions with their corresponding equivalent single instructions, said identification and replacement being performed before said determination of optimal number of times to unroll loops of said program.

18. The computer system as set forth in claim 16, wherein, said first and second register allocator being the same register allocator;

said first and second scheduler being the same scheduler, said first scheduler being said same scheduler operating in a first mode, and said second scheduler being said same scheduler operating in a second mode;

said first and second loop unroller being the same loop unroller, said first loop unroller being said same loop unroller operating in a first mode, and said second loop unroller being said same loop unroller operating in a second mode.

* * * * *